United States Patent
Li et al.

(10) Patent No.: US 8,368,417 B2
(45) Date of Patent: Feb. 5, 2013

(54) METHOD AND DEVICE FOR DETECTING BRIGHT DOT OR DARK DOT IN LIQUID CRYSTAL DISPLAY

(75) Inventors: Li Li, Beijing (CN); Zhilong Peng, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 793 days.

(21) Appl. No.: 12/547,794

(22) Filed: Aug. 26, 2009

(65) Prior Publication Data

US 2010/0056008 A1 Mar. 4, 2010

(30) Foreign Application Priority Data

Aug. 27, 2008 (CN) .......................... 2008 1 0119137

(51) Int. Cl.
*G01R 31/26* (2006.01)
(52) U.S. Cl. ................................. 324/760.01
(58) Field of Classification Search ............. 345/38–50, 345/60–64, 87, 104; 348/751–766, 790; 349/19–54, 188–192, 84–92; 369/84, 242; 626/561; 324/760
See application file for complete search history.

(56) References Cited

U.S. PATENT DOCUMENTS

| 2006/0033852 A1* | 2/2006 | Kim | .................................. 349/38 |
| 2008/0057818 A1* | 3/2008 | Ogawa | .............................. 445/3 |
| 2008/0158241 A1 | 7/2008 | Park | |

FOREIGN PATENT DOCUMENTS

| CN | 2627501 Y | 7/2004 |
| CN | 1976484 A | 6/2007 |
| CN | 101174376 A | 5/2008 |
| JP | 08-114816 A | 5/1996 |
| JP | 09-015997 A | 1/1997 |
| JP | 09-257639 A | 10/1997 |
| JP | 09-318487 A | 12/1997 |
| JP | 2005-181040 A | 7/2005 |
| JP | 2006-266786 A | 10/2006 |

* cited by examiner

*Primary Examiner* — Jermele M Hollington
*Assistant Examiner* — Alesa Allgood
(74) *Attorney, Agent, or Firm* — Ladas & Parry LLP

(57) ABSTRACT

A method for detecting a bright dot or a dark dot in a LCD comprising applying a first detection voltage to a color filter substrate common electrode and forming a first voltage difference between the color filter substrate common electrode and a pixel electrode on an array substrate; collecting a first luminance value of the bright dot or the dark dot after the bright dot or the dark dot is observed; switching the first detection voltage applied to the color filter substrate common electrode to a second detection voltage, and thus forming a second voltage difference between the color filter substrate common electrode and the pixel electrode; collecting a second luminance value of the bright dot or the dark dot; determining the difference between the first luminance value and the second luminance value, so that the bright dot or the dark dot can be determined to result from a liquid crystal cell defect or an array substrate defect.

14 Claims, 3 Drawing Sheets

METHOD AND DEVICE FOR DETECTING BRIGHT DOT OR DARK DOT IN LIQUID CRYSTAL DISPLAY

BACKGROUND

Embodiments of the present invention relate to a method and a device for detecting a bright dot or a dark dot in liquid crystal display.

Liquid crystal displays (TFT-LCDs) possess advantages of small volume, low power consumption, low radiation, etc., and are gradually prevailing in the market of flat plate displays. Generally, a liquid crystal display comprises an array substrate and a color filter substrate attached together and sandwiching a liquid crystal layer therebetween. Gate lines for providing scanning signals, data lines for providing data signals, pixel electrodes, and array substrate electrodes for providing common voltage are provided on the array substrate, and a black matrix, color filters and a color filter substrate common electrode are provided on the color filter substrate.

Generally, detection is required after the array substrate and the color filter substrate are attached together to form a liquid crystal cell in order to rule out defective products and then repair the defect. FIG. 6 is a schematic view showing the structure of a conventional device for detecting a bright dot or a dark dot in a LCD. The method utilizes the common electrodes for detecting a bright dot or a dark dot. As shown in FIG. 6, the conventional detection device mainly comprises a voltage input terminal 20, an operational amplifier A, a first resistance R1, a second resistance R2 and a voltage output terminal 40. The voltage input terminal 20 is connected with a power source (not shown), and the voltage output terminal 40 is connected with the array substrate common electrode and the color filter substrate common electrode. By applying a same detection voltage to the array substrate common electrode and the color filter substrate common electrode, a bright dot or a dark dot in the LCD can be observed.

In addition, a bright dot or a dark dot in a LCD may result from an array substrate defect or a defect occurring in the liquid crystal cell. Although the bright dot or the dark dot in a LCD can be observed through the conventional detection device, it is impossible by using the conventional detection device to distinguish that the bright dot or the dark dot is resulted from an array substrate defect or from a liquid crystal cell defect. In practice, it is important for subsequent repair processing to determine the type of the defect. After cell process to assemble the substrates together, the array substrate defect can be repaired by a laser repair process, but feasible method for repairing the liquid crystal cell defect have not been developed yet. In addition, the type of the defects can typically be determined with microscopy; however, it is impossible to detect some bright dots or dark dots defects (for example, a defect occurring in the TFT channel region, the region shielded by the black matrix and the like) with microscopy only. Usually, the product in which the type of the defect cannot be determined may be discarded, and thus the production cost is increased and the production efficiency is decreased.

SUMMARY OF THE INVENTION

An aspect of the invention provides a method for detecting a bright dot or a dark dot in LCD comprising the following steps:

step 1 of applying a first detection voltage to a color filter substrate common electrode on a color filter substrate and forming a first voltage difference between the color filter substrate common electrode and a pixel electrode on an array substrate;

step 2 of determining whether a bright dot or a dark dot occurs in the LCD and carrying out step 3 if there exists a bright dot or a dark dot in the LCD or step 7 if there does not exist a bright dot or a dark dot in the LCD;

step 3 of collecting a first luminance value of the bright dot or the dark dot;

step 4 of switching the first detection voltage applied to the color filter substrate common electrode to a second detection voltage, and thus forming a second voltage difference between the color filter substrate common electrode and the pixel electrode on the array substrate;

step 5 of collecting a second luminance value of the bright dot or the dark dot;

step 6 of determining the difference between the first luminance value and the second luminance value, so that the bright dot or the dark dot is determined to result from a liquid crystal cell defect if |the first luminance value−the second luminance value|≦A, and is determined to result from an array substrate defect if |the first luminance value−the second luminance value|≧B, wherein A is a first pre-determined difference value, B is a second pre-determined difference value; and Step 7 of ending the detection process.

Another aspect of the invention provides a device for detecting a bright dot or a dark dot in LCD comprises: a power source; an array substrate voltage output terminal for applying a detection voltage to an array substrate common electrode on an array substrate; a color filter substrate voltage output terminal for applying a detection voltage to another color filter substrate common electrode on a color filter substrate to produce a voltage difference between the color filter substrate common electrode and a pixel electrode on the array substrate; and a switch connected between the power source and the color filter substrate voltage output terminal for changing the voltage difference.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DESCRIPTION OF THE EMBODIMENTS

Figure 1:
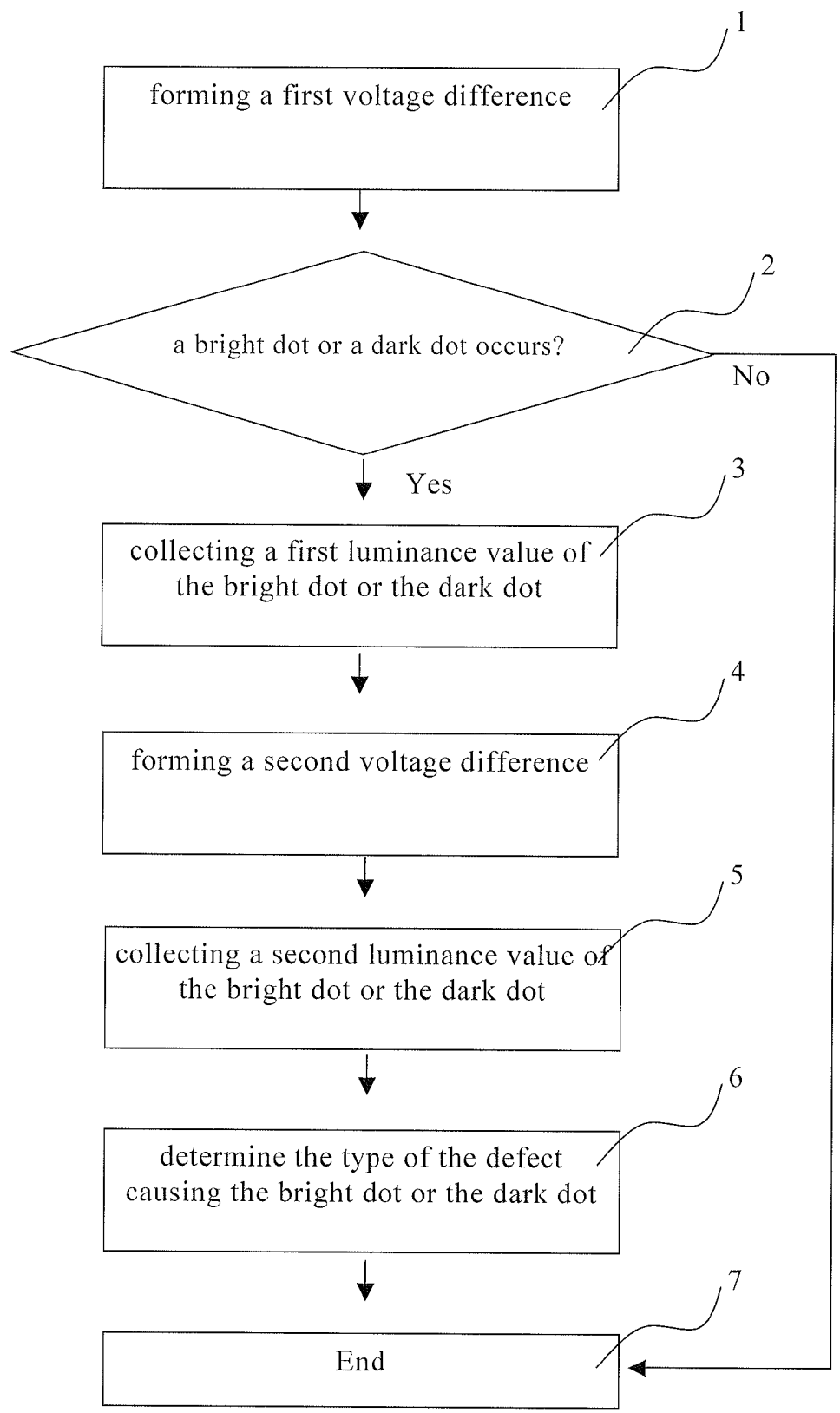
FIG. 1 is a flow chart showing a method for detecting a bright dot or a dark dot in a LCD according to the invention.

FIG. 1 is a flow chart showing a method for detecting a bright dot or a dark dot in a LCD according to an embodiment of the invention.

In the embodiment, the LCD to be detected comprises an array substrate and a color filter substrate attached together to form a liquid crystal cell and sandwiching a liquid crystal layer therebetween. Gate lines for transmitting scanning signals, data lines for transmitting data signals, pixel electrodes, and array substrate electrodes for providing common voltage are provided on the array substrate, and a black matrix, color filters and a color filter substrate common electrode are provided on the color filter substrate. As shown in FIG. 1, the method comprises the following steps:

step 1 of applying a first detection voltage to the color filter substrate common electrode on the color filter substrate and forming a first voltage difference between the color filter substrate common electrode and the pixel electrode on the array substrate;

step 2 of determining whether a bright dot or a dark dots occurs in the LCD, carrying out step 3 if there exists a bright dot or a dark dot in the LCD or step 7 if there does not exist a bright dot or a dark dot in the LCD;

step 3 of collecting a first luminance value of the bright dot or the dark dot;

step 4 of switching the first detection voltage applied to the color filter substrate common electrode to a second detection voltage, and thus forming a second voltage difference between the color filter substrate common electrode and the pixel electrode on the array substrate;

step 5 of collecting a second luminance value of the bright dot or the dark dot;

step 6 of determining a difference between the first luminance value and the second luminance value, wherein the bright dot or the dark dot is determined to result from the a liquid crystal cell defect if |the first luminance value−the second luminance value|≦A, and is determined to result from an array substrate defect if |the first luminance value−the second luminance value|≧B, and wherein A is a first pre-determined difference value, B is a second pre-determined difference value; and step 7 of ending the detection process.

According to the present embodiment, the type of a defect is determined by changing the detection voltage applied to the color filter substrate common electrode to change the voltage difference between the color filter substrate common electrode and the pixel electrode on the array substrate. In practice, the value of the second detection voltage may be larger or smaller than that of the first detection voltage, as long as the voltage difference between the color filter substrate common electrode and the pixel electrode on the array substrate is changed. If the luminance value of the bright dot is represented in gray scale, the first difference value A may be 10~30 in gray scale, and the second difference value B may be 50~100 in gray scale.

The method for detecting a bright dot or a dark dot in a LCD according to the embodiment of the invention is described in detail as follows.

As for the LCD of a normally white mode to be detected, the first detection voltage is respectively applied to the array substrate common electrode and the color filter substrate common electrode so that the voltage difference formed between the color filter substrate common electrode on the color filter substrate and the pixel electrode on the array substrate becomes largest and liquid crystal molecules between the substrates are deflected to the largest extent, and thus the LCD displays black (L0 mode and gray scale is equal to 0). Then, the LCD is examined to determine whether there exists a bright dot. Since the LCD is in L0 mode at this time, the bright dot can be easily observed if it exists. If no bright dot is observed, there exists no bright dot defect in the LCD and the detection process is ended. If a bright dot is observed, the first luminance value of the bright dot is collected and the determination of the type of the bright dot defect is started. Specifically, the first detection voltage applied to the color filter substrate common electrode is switched to the second detection voltage, and thus the voltage difference between the color filter substrate common electrode and the pixel electrode is changed, the deflection of the liquid crystal molecules is changed and correspondingly the gray scale presented in the LCD is changed. After the voltage difference between the color filter substrate common electrode and the pixel electrode is changed, two different cases occur with respect to the bright dot.

In the first case, there is no change or little change in the luminance of the bright dot. Although the gray scale of the LCD is changed after the first detection voltage applied to the color filter substrate common electrode is switched to the second detection voltage, the bright dot still exists and the second luminance value of the bright dot is collected. The luminance change of the bright dot is determined by comparing the first luminance value and the second luminance value. If |the first luminance value−the second luminance value|≦A, it is considered that there is no change or little change in the luminance of the bright dot, wherein A is the first pre-determined difference vale. In practice, the luminance of the bright dot can be represented in gray scale. The first luminance value is generally in the range of 200~255 in gray scale, and thus the first difference value A is previously pre-determined to be 10~30 in gray scale. That is, if the difference between the first luminance value and the second luminance value is smaller than or equal to 10~30 in gray scale, it is considered that there is no change or little change in the luminance of the bright dot. This means that the voltage difference between the two sides of the liquid crystal layer at the bright dot is not changed. In other words, although the voltage difference between the color filter substrate common electrode and the pixel electrode is changed, such change has no influence on the voltage difference of the liquid crystal layer at the bright dot. Therefore, the bright dot defect results from a short circuit due to the particles in the liquid crystal layer holding in the liquid crystal cell, and the bright dot defect is determined to result from a liquid crystal cell defect and the detection process is ended.

In the second case, the luminance of the bright dot changes and becomes dark. The gray scale of the LCD is changed after the first detection voltage is switched to the second detection voltage, but the bright dot becomes darker to a larger extent, and even completely black. At this time, the second luminance value of the bright dot is also collected, and the luminance change of the bright dot is determined by comparing the first luminance value and the second luminance value. If |the first luminance value−the second luminance value|≧B, it is considered that the luminance of the bright dot is considerably changed, wherein B is the pre-determined second difference vale. Similarly, the luminance of the bright dot is represented in gray scale. The second luminance value is generally in the range of L0~L50, and thus the second difference value B is previously determined to be 50~100 in gray scale. That is, if the difference between the first luminance value and the second luminance value is larger than or equal to 50~100 in gray scale, it is considered that the luminance of the bright dot is considerably changed. This means that the voltage difference between the two sides of the liquid crystal layer at the bright dot is changed. In other words, the voltage difference between the color filter substrate common electrode and the pixel electrode is changed, and such change exhibits a direct influence on the voltage difference applied on the liquid crystal layer at the bright dot. Therefore, the bright dot defect is determined to result from an array substrate defect, for example, the defect occurring in the TFT channel region and the like, and the detection process is ended.

As for the LCD of a normally black mode to be detected, the first detection voltage is respectively applied to the array substrate common electrode and the color filter substrate common electrode so that the voltage difference formed between the color filter substrate common electrode on the color filter substrate and the pixel electrode on the array substrate becomes largest and the liquid crystal molecules between the common electrodes are deflected to the largest extent, and thus the LCD displays white (L255 mode and the gray scale is equal to 255). Then, the LCD is examined to determine whether there exists a dark dot. Since the LCD is in L255 mode at this time, the dark dot can be easily observed if it actually exists. If no dark dots are observed, there exists no dark dot defects in the LCD and the detection process is ended. If a dark dot is observed, the first luminance value of the dark dot is collected and the determination of the type of the dark dot defect is started. Specifically, the first detection voltage applied to the color filter substrate common electrode is switched to the second detection voltage, and thus the voltage difference between the color filter substrate common electrode and the pixel electrode is changed, the deflection of the liquid crystal molecules is changed and correspondingly the gray scale of the LCD is changed. After changing the voltage difference between the color filter substrate common electrode and the pixel electrode, two different cases with respect to the dark dot occur.

In the first case, there is no change or little change in the luminance of the dark dot. Although the gray scale of the LCD is changed after the first detection voltage applied to the color filter substrate common electrode is switched to the second detection voltage, the dark dot still exists and a similar method as described above is employed to determine whether the luminance of the dark dot is changed. The fact that there is no change or little change in the luminance of the dark dot means that the voltage difference between the two sides of the liquid crystal layer positioned at the dark dot is not changed. In other words, although the voltage difference between the color filter substrate common electrode and the pixel electrode is changed, such change has no influence on the voltage difference of the liquid crystal layer at the dark dot. Therefore, it is considered that the dark dot defect results from a short circuit due to the particles in the liquid crystal layer holding in the cell, and thus the dark dot defect is determined to result from a liquid crystal cell defect and the detection process is ended.

In the second case, the luminance of the dark dot changes to be bright. Although the gray scale of the LCD is changed after the first detection voltage is switched to the second detection voltage, the dark dot becomes brighter to a larger extent, and even completely white. A similar method as described above is employed to determine whether the luminance of the dark dot is changed. The fact that the luminance of the dark dot is considerably changed means that the voltage difference between the two sides of the liquid crystal layer at the dark dot is changed. In other words, the voltage difference between the color filter substrate common electrode and the pixel electrode is changed, and such change exhibits a direct influence on the voltage difference of the liquid crystal layer at the dark dot. Therefore, the dark dot defect is determined to result from an array substrate defect, for example, a defect in the TFT channel region and the like, and the detection process is ended.

With the method for detecting a bright dot or a dark dot in a LCD according to the embodiment, the detection voltage is respectively applied to the array substrate common electrode on the array substrate and the color filter substrate common electrode on the color filter substrate, and the voltage difference between the color filter substrate common electrode and the pixel electrode on the array substrate is changed by changing the detection voltage applied to the color filter substrate common electrode, and thus the type of the defect can be determined to be an array substrate array or a liquid crystal cell defect. Compared with the conventional technology in which the bright dot or the dark dot can be observed but the type thereof cannot be determined, the detection method provided in the embodiment is simple and can be used to correctly determined the type of the bright dots or dark dots, which is helpful to analyze and repair the defects. Therefore, the production cost can be reduced.

Figure 2:
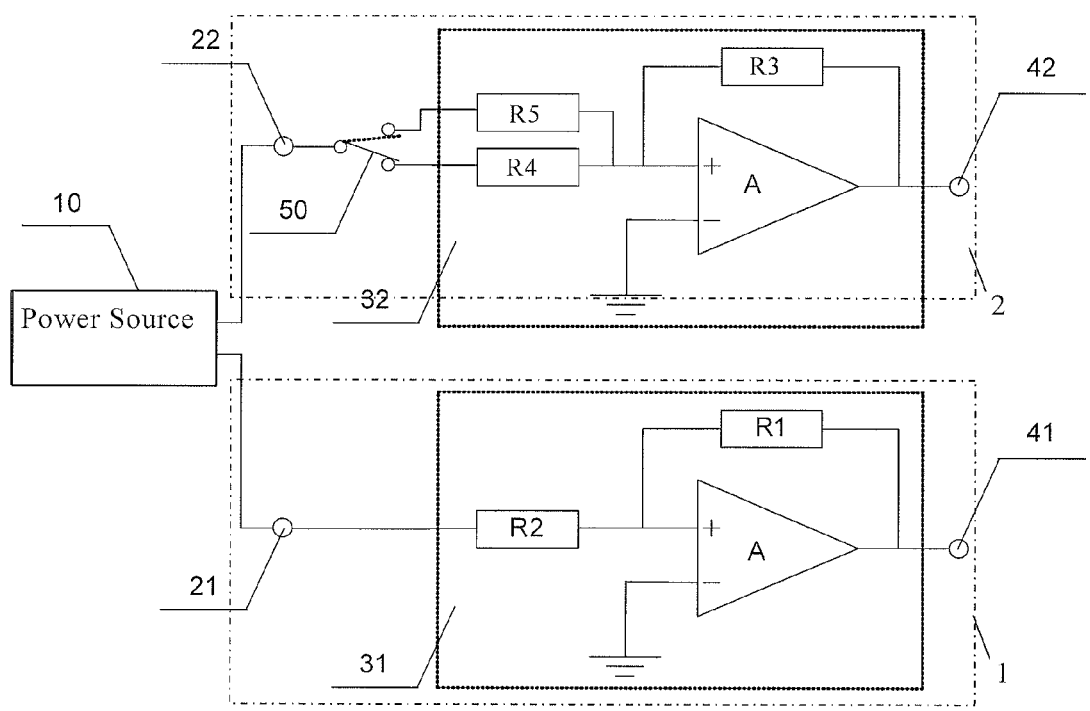
FIG. 2 is a structural schematic view showing a device for detecting a bright dot or a dark dot in a LCD according to a first embodiment of the invention.

FIG. 2 is a structural schematic view showing a device for detecting a bright dot or a dark dot in a LCD according to a first embodiment of the invention. As shown in FIG. 2, the device for detecting a bright dot or a dark dot in a LCD according to the present embodiment mainly comprises a power source 10 and two substrate modules 1 and 2. The power source 10 is simultaneously connected with the array substrate module 1 and the color filter substrate module 2 to provide a detection voltage. In the present embodiment, the array substrate module 1 comprises an array substrate voltage input terminal 21, a first operational amplifier unit 31 and an array substrate voltage output terminal 41, which are connected in series. The array substrate voltage input terminal 21 is connected with the power source 10 and the array substrate voltage output terminal 41 is connected with array substrate common electrode on the array substrate, so that a first detection voltage is applied to the array substrate common electrode. The first operational amplifier unit 31 comprises an operational amplifier A, a first resistance R1 and a second resistance R2. The first resistance R1 is connected in parallel between the positive input terminal of the operational amplifier A and the output terminal of the operational amplifier A, the second resistance R2 is connected between the array substrate voltage input terminal 21 and the positive input terminal of the operational amplifier A, and the negative input terminal of the operational amplifier A is grounded. In the present embodiment, the color filter substrate module 2 comprises a color filter substrate voltage input terminal 22, a switch 50, a second operational amplifier unit 32 and a color filter substrate voltage output terminal 42, which are connected in series. The color filter substrate voltage input terminal 22 is connected with the power source 10 and the voltage output terminal 42 of the color filter substrate module is connected with the color filter substrate common electrode on the color filter substrate, so that a first detection voltage and a second detection voltage are applied to the color filter substrate common electrode. The second operational amplifier unit 32 comprises an operational amplifier A, a third resistance R3, a fourth resistance R4 and a fifth resistance R5. The third resistance R3 is connected in parallel between the positive input terminal of the operational amplifier A and the output terminal thereof, the fourth resistance R4 and the fifth resistance R5 are connected in parallel between the switch 50 and the positive input terminal of the operational amplifier A, and the negative input terminal of the operational amplifier A is grounded. The control terminal of the switch 50 is connected with the input terminal 22 of the color filter substrate voltage, one switch terminal of the switch 50 is connected with the fourth resistance R4, and the other switch terminal of the switch 50 is connected with the fifth resistance R5. By controlling the switch 50 to be connected with the fourth resistance R4 or the fifth resistance R5, the first detection voltage or the second detection voltage can be applied to the color filter substrate common electrode. In practice, the value of the third resistance R3 and the fifth resistance R5 is in the range of about 1 kΩ~about 2000 kΩ, and determined as necessary.

As for a LCD of a normally white mode to be detected, the operation process of the device for detecting a bright dot or a dark dot in a LCD according to the present embodiment is described as follows. Firstly, the control terminal of the switch 50 is connected with the fourth resistance R4, and the detection voltage is provided by the power source 10. At this time, the current passage of the array substrate module 1 is the same as that of the color filter substrate module 2, the same first detection voltage can be applied to the array substrate common electrode through the array substrate voltage output terminal 41 and to the color filter substrate common electrode through the color filter substrate voltage output terminal 42, so that a largest voltage difference is produced between the color filter substrate common electrode on the color filter substrate and the pixel electrode on the array substrate and the liquid crystal molecules are deflected to the largest extent, and thus the LCD displays black (L0). Then, the LCD is examined to determine whether there exists a bright dot. If a bright dot is observed, the control terminal of the switch 50 is switched to be connected with the fifth resistance R5, so that the second detection voltage is applied to the color filter substrate common electrode through the color filter substrate voltage output terminal 42. At the same time, the first detection voltage applied to the array substrate common electrode through the array substrate voltage output terminal 41 is not changed. Since the first detection voltage applied to the color filter substrate common electrode is switched to the second detection voltage, the voltage difference between the color filter substrate common electrode and the pixel electrode is changed, the deflection of the liquid crystal molecules is changed and correspondingly the gray scale of the LCD is changed. Then, the bright dot is examined to determine whether the luminance thereof is changed. If there is no change or little change in the luminance of the bright dot, it is considered that the bright dot comes from a liquid crystal cell defect; and if the bright dot becomes dark and even completely black, it is considered that the bright dot comes from an array substrate defect.

As for a LCD of a normally black mode to be detected, the operation process of the device for detecting a bright dot or a dark dot in a LCD according to the present embodiment is described as follows. Firstly, the control terminal of the switch 50 is connected with the fourth resistance R4, and the detection voltage is provided by the power source 10. Since the current passage of the array substrate module 1 is the same as that of the color filter substrate module 2 at present, the same first detection voltages are applied to the array substrate common electrode through the array substrate voltage output terminal 41 and to the color filter substrate common electrode through the color filter substrate voltage output terminal 42, so that a largest voltage difference is produced between the color filter substrate common electrode on the color filter substrate and the pixel electrode on the array substrate, and the liquid crystal molecules between the common electrodes are deflected to the largest extent, and thus the LCD displays white (L255). Then, the LCD is examined to determine whether there exists a dark dot. If a dark dot is observed, the control terminal of the switch 50 is switched to be connected with the fifth resistance R5, so that the second detection voltage is applied to the color filter substrate common electrode through the color filter substrate voltage output terminal 42. At the same time, the first detection voltage applied to the array substrate common electrode by the array substrate voltage output terminal 41 is not changed. Since the first detection voltage applied to the color filter substrate common electrode is switched to the second detection voltage, the voltage difference between the color filter substrate common electrode and the pixel electrode is changed, the deflection of the liquid crystal molecules is changed and correspondingly the gray scale of the LCD is changed. Then, the dark dot is examined to determine whether the luminance of the dark dot is changed. If there is no change or little change in the luminance of the dark dot, it is considered that the dark dot results from a liquid crystal cell defect; and if the dark dot becomes brighter and even completely white, it is considered that the dark dot results from an array substrate defect.

Figure 3:
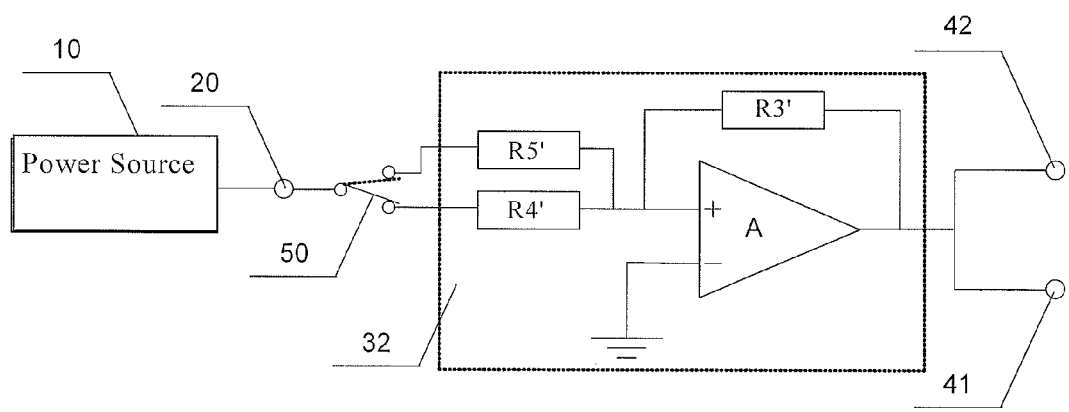
FIG. 3 is a structural schematic view showing a device for detecting a bright dot or a dark dot in a LCD according to a second embodiment of the invention.

FIG. 3 is a structural schematic view showing a device for detecting a bright dot or a dark dot in a LCD according to a second embodiment of the invention. As shown in FIG. 3, the device for detecting a bright dot or a dark dot in a LCD according to the present embodiment is a modification of the first embodiment and mainly comprises a power source 10 and a substrate module 1. The power source 10 is used to provide a detection voltage, and the substrate module 1 is used to apply a first detection voltage to the array substrate common electrode on the array substrate and to apply a first detection voltage or a second detection voltage to the color filter substrate common electrode on the color filter substrate. In the present embodiment, the substrate module 1 comprises a voltage input terminal 20, a switch 50, a second operational amplifier unit 32, an array substrate voltage output terminal 41 and a color filter substrate voltage output terminal 42. The voltage input terminal 20 is connected with the power source 10, the array substrate voltage output terminal 41 is connected between the second operational amplifier unit 32 and the array substrate common electrode on the array substrate, and the color filter substrate voltage output terminal 42 is connected between the second operational amplifier unit 32 and the color filter substrate common electrode on the color filter substrate. The second operational amplifier unit 32 comprises an operational amplifier A, a third resistance R3', a fourth resistance R4' and a fifth resistance R5'. The third resistance R3' is connected in parallel between the positive input terminal of the operational amplifier A and the output terminal thereof, the fourth resistance R4' and the fifth resistance R5' are connected in parallel between the switch 50 and the positive input terminal of the operational amplifier A, and the negative input terminal of the operational amplifier A is grounded. The control terminal of the switch 50 is connected with the voltage input terminal 20, one switch terminal of the switch 50 is connected with the fourth resistance R4', and the other switch terminal of the switch 50 is connected with the fifth resistance R5'. By controlling the switch 50 to be connected with the fourth resistance R4' or the fifth resistance R5', the first detection voltage or the second detection voltage is applied to the array substrate common electrode through the array substrate voltage output terminal 41 and to the color filter substrate common electrode through the color filter substrate voltage output terminal 42.

The operation process of the device in the present embodiment is the same as that in the first embodiment except that the detection voltage applied to the array substrate common electrode is changed during the detection process. Since the change of the detection voltage applied to the array substrate common electrode has little influence on the bright dot or the dark dot, the device of the present embodiment can also be used to correctly determine the type of the defect, and it further has an advantage of simpler structure.

Figure 4:
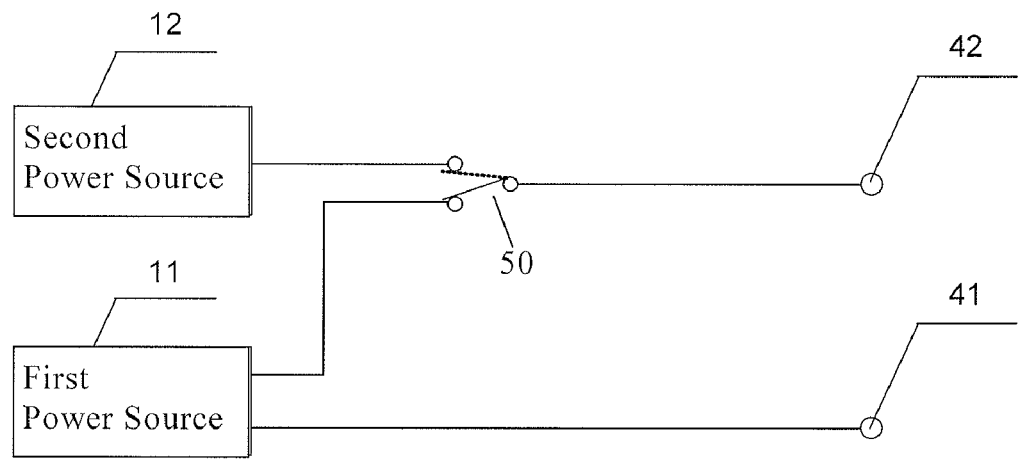
FIG. 4 is a structural schematic view showing a device for detecting a bright dot or a dark dot in a LCD according to a third embodiment of the invention.

FIG. 4 is a structural schematic view showing a device for detecting a bright dot or a dark dot in a LCD according to a third embodiment of the invention. As shown in FIG. 4, the device for detecting a bright dot or a dark dot in a LCD according to the present embodiment mainly comprises two power sources 11 and 12, two voltage output terminals 41 and 42 and a switch 50. Specifically, the first power source 11 is used to provide the first detection voltage and apply the first detection voltage to the array substrate common electrode on the array substrate through the array substrate voltage output terminal 41. The second power source 12 is used to provide the second detection voltage. The first detection voltage and the second detection voltage are respectively applied to the color filter substrate common electrode on the color filter substrate by the first power source 11 and the second power source 12 through the switch 50 and the color filter substrate voltage output terminal 42. One switch terminal of the switch 50 is connected with the first power source 11, the other switch terminal of the switch 50 is connected with the second power source 12, the control terminal of the switch 50 is connected with the color filter substrate voltage output terminal 42, and the array substrate voltage output terminal 41 is also connected with the first power source 11. In practice, the value of the second detection voltage is larger or smaller than that of the first detection voltage, as long as the voltage difference between the color filter substrate common electrode and the pixel electrode on the array substrate is changed.

As for a LCD of a normally white mode to be detected, the operation process of the device for detecting a bright dot or a dark dot in a LCD according to the present embodiment is described as follows. Firstly, the control terminal of the switch 50 is connected with the first power source 11, and the same first detection voltage is applied to the array substrate common electrode from the first power source 11 through the array substrate voltage output terminal 41 and to the color filter substrate common electrode from the first power source 11 through the color filter substrate voltage output terminal 42 so that the LCD displays black (L0). Then, the LCD is examined to determine whether there exists a bright dot. If a bright dot is observed, the control terminal of the switch 50 is connected with the second power source 12, so that the second detection voltage is applied to the color filter substrate common electrode through the color filter substrate voltage output terminal 42, while the first detection voltage applied to the array substrate common electrode through the array substrate voltage output terminal 41 is not changed. Then, the bright dot is examined to determine whether the luminance of the bright dot is changed. If there is no change or little change in the luminance of the bright dot, it is considered that the bright dot comes from a liquid crystal cell defect; and if the bright dot becomes darker and even completely black, it is considered that the bright dot comes from an array substrate defect.

As for a LCD of a normally black mode to be detected, the operation process of the device for detecting a bright dot or a dark dot in a LCD according to the present embodiment is described as follows. Firstly, the control terminal of the switch 50 is connected with the first power source 11, and the same first detection voltage is applied to the array substrate common electrode from the first power source 11 through the array substrate voltage output terminal 41 and to the color filter substrate common electrode from the first power source 11 through the color filter substrate voltage output terminal 42 so that the LCD displays white (L255). Then, the LCD is examined to determine whether there exists a dark dot. If a dark dot is observed, the control terminal of the switch 50 is connected with the second power source 12, so that the second detection voltage is applied to the color filter substrate common electrode by the color filter substrate voltage output terminal 42, while the first detection voltage applied to the array substrate common electrode by the array substrate voltage output terminal 41 is not changed. Then, the dark dot is examined to determine whether the luminance of the dark sport is changed. If there is no change or little change in the luminance of the dark dot, it is considered that the dark dot comes from a liquid crystal cell defect; and if the dark dot becomes brighter and even completely white, it is considered that the dark dot comes from an array substrate defect.

Figure 5:
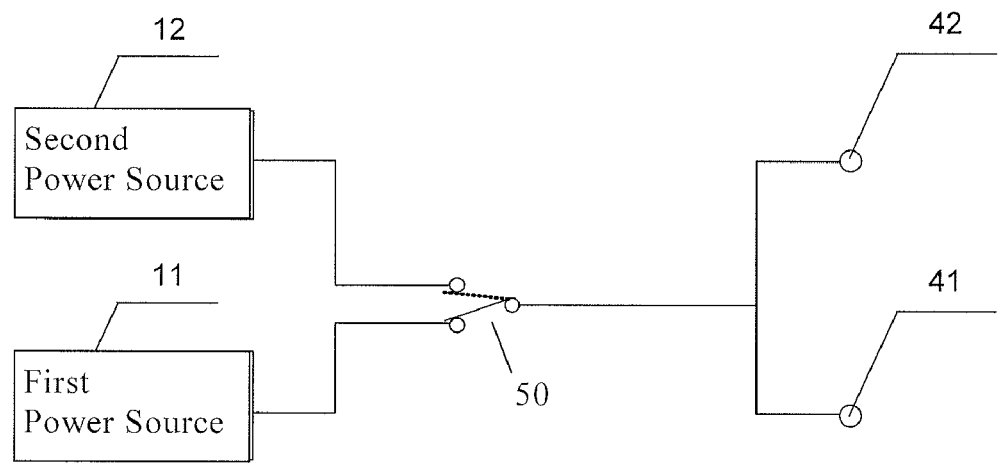
FIG. 5 is a structural schematic view showing a device for detecting a bright dot or a dark dot in a LCD according to a fourth embodiment of the invention.
Figure 6:
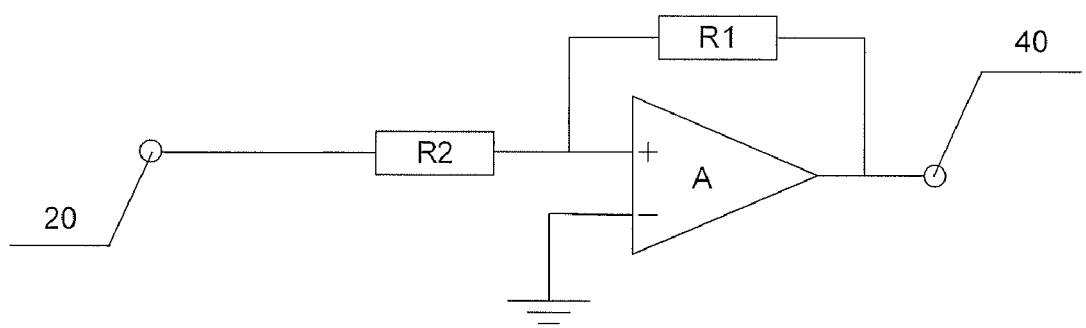
FIG. 6 is a structural schematic view showing a conventional device for detecting a bright dot or a dark dot in liquid crystal device.

FIG. 5 is a structural schematic view showing a device for detecting a bright dot or a dark dot in a LCD according to a fourth embodiment of the invention. As shown in FIG. 5, the device for detecting a bright dot or a dark dot in a LCD according to the present embodiment is a modification of the third embodiment and mainly comprises two power sources 11 and 12, two voltage output terminals 41 and 42, and a switch 50. Specifically, the first power source 11 is used to provide the first detection voltage, and the second power source 12 is used to provide the second detection voltage. The first detection voltage or the second detection voltage is applied to the array substrate common electrode on the array substrate and the color filter substrate common electrode on the color filter substrate from the first power source 11 or the second power source 12. One switch terminal of the switch 50 is connected with the first power source 11, the other switch terminal of the switch 50 is connected with the second power source 12, and the control terminal of the switch 50 is connected with the array substrate voltage output terminal 41 and the color filter substrate voltage output terminal 42.

The operation process of the device in the present embodiment is identical with that in the third embodiment except that the detection voltage applied to the array substrate common electrode is changed during the detection process. Since the change of the detection voltage applied to the array substrate common electrode has little influence on the bright dot or the dark dot, the device of the present embodiment can also be used to correctly determine the type of the defect, and it further has an advantage of simpler structure.

With the device for detecting a bright dot or a dark dot in a LCD according to the embodiments, the detection voltages are respectively applied to the array substrate common electrode on the array substrate and the color filter substrate common electrode on the color filter substrate, and the voltage difference between the color filter substrate common electrode and the pixel electrode on the array substrate is changed by changing the detection voltage applied to the color filter substrate common electrode, and thus the type of the defect can be determined. Compared with the conventional technology in which the bright dot or the dark dot can be observed but the type thereof cannot be determined, the detection device provided in the embodiments of the invention has a simple structure and can be used to correctly determined the type of the bright dot or dark dot, which is helpful to analyze and repair the defect. Therefore, the production cost can be reduced.

Preferably, in the above amendments, the resistance value of the second resistance is 1.5~3.5 times larger than that of the third resistance. In the detection process in the above embodiments, the voltage applied to the pixel electrode maintains substantially constant on forming the first voltage difference and the second voltage difference between the color filter substrate common electrode and the pixel electrode on the array substrate for the purpose of detecting.

It should be appreciated that the embodiments described above are intended to illustrate but not limit the present invention. Although the present invention has been described in detail herein with reference to the preferred embodiments, it should be understood by those skilled in the art that the present invention can be modified and some of the technical features can be equivalently substituted without departing from the spirit and scope of the present invention.

What is claimed is:

1. A method for detecting a bright dot or a dark dot in a LCD, comprising:
    step 1 of applying a first detection voltage to a color filter substrate common electrode on a color filter substrate and forming a first voltage difference between the color filter substrate common electrode and a pixel electrode on an array substrate;
    step 2 of determining whether a bright dot or a dark dot occurs in the LCD and carrying out step 3 if there exists a bright dot or a dark dot in the LCD or step 7 if there does not exist a bright dot or a dark dot in the LCD;
    step 3 of collecting a first luminance value of the bright dot or the dark dot;
    step 4 of switching the first detection voltage applied to the color filter substrate common electrode to a second detection voltage, and thus forming a second voltage difference between the color filter substrate common electrode and the pixel electrode on the array substrate;
    step 5 of collecting a second luminance value of the bright dot or the dark dot;
    step 6 of determining the difference between the first luminance value and the second luminance value, so that the bright dot or the dark dot is determined to result from a liquid crystal cell defect if |the first luminance value−the second luminance value|≦A, and is determined to result from an array substrate defect if |the first luminance value−the second luminance value|≧B, wherein A is a first pre-determined difference value, B is a second pre-determined difference value; and
    step 7 of ending the detection process.

2. The method for detecting a bright dot or a dark dot in a LCD according to claim 1, wherein as for the LCD of a normally white mode to be detected, the step 1 comprises that the first detection voltage is applied to the color filter substrate common electrode on the color filter substrate so that a first voltage difference is formed between the color filter substrate common electrode and the pixel electrode on the array substrate, and thus the LCD displays black.

3. The method for detecting a bright dot or a dark dot in a LCD according to claim 2, wherein the first difference value is 10~30 in gray scale, and the second difference value is 50~100 in gray scale.

4. The method for detecting a bright dot or a dark dot in a LCD according to claim 1, wherein as for the LCD of a normally black mode to be detected, the step 1 comprises that the first detection voltage is applied to the color filter substrate common electrode on the color filter substrate so that a first voltage difference is formed between the color filter substrate common electrode and the pixel electrode on the array substrate, and thus the LCD displays white.

5. The method for detecting a bright dot or a dark dot in a LCD according to claim 4, wherein the first difference value is 10~30 in gray scale, and the second difference value is 50~100 in gray scale.

6. The method for detecting a bright dot or a dark dot in a LCD according to claim 1, wherein the first difference value is 10~30 in gray scale, and the second difference value is 50~100 in gray scale.

7. The method for detecting a bright dot or a dark dot in a LCD according to claim 1, wherein, in the step 1, the first diction voltage is also applied to an array substrate common electrode on the array substrate.

8. The method for detecting a bright dot or a dark dot in a LCD according to claim 7, wherein, in the step 4, the first diction voltage is still applied to the array substrate common electrode on the array substrate.

9. The method for detecting a bright dot or a dark dot in a LCD according to claim 8, wherein, in the step 4, the second diction voltage is also applied to the array substrate common electrode on the array substrate.

10. A device for detecting a bright dot or a dark dot in LCD, comprising:
    a power source
    an array substrate voltage output terminal for applying a detection voltage to an array substrate common electrode on an array substrate;
    a color filter substrate voltage output terminal for applying a detection voltage to another color filter substrate common electrode on a color filter substrate to produce a voltage difference between the color filter substrate common electrode and a pixel electrode on the array substrate; and
    a switch connected between the power source and the color filter substrate voltage output terminal and adapted to apply different detection voltages to the color filter substrate common electrode for changing the voltage difference.

11. The device for detecting a bright dot or a dark dot in a LCD according to claim 10, wherein
    the power source is connected with a first operational amplifier unit and a second operational amplifier unit;
    the first operational amplifier unit comprises a first operational amplifier, a first resistance and a second resistance, the first resistance is connected in parallel between the positive input terminal of the first operational amplifier and the output terminal of the first operational amplifier, the second resistance is connected between the power source and the positive input terminal of the first operational amplifier, the negative input terminal of the first operational amplifier is grounded, and the output terminal of the first operational amplifier is connected with the array substrate voltage output terminal; and
    the second operational amplifier unit comprises a second operational amplifier, a third resistance, a fourth resistance and a fifth resistance, the third resistance is connected in parallel between the positive input terminal of the second operational amplifier and the output terminal thereof, one end of the fourth resistance and the fifth resistance are connected with the positive input terminal of the second operational amplifier, the other end of the fourth resistance and the fifth resistance are respectively connected with two switch terminals of the switch, the negative input terminal of the second operational amplifier is grounded, the output terminal of the second operational amplifier is connected with the color filter substrate voltage output terminal, and the control terminal of the switch is connected with the power source.

12. The device for detecting a bright dot or a dark dot in a LCD according to claim 10, wherein
the power source is connected with a second operational amplifier unit; and
the second operational amplifier unit comprises an operational amplifier, a third resistance, a fourth resistance and a fifth resistance, the third resistance is connected in parallel between the positive input terminal of the operational amplifier and the output terminal of the operational amplifier, the third resistance and the fifth resistance at one end are connected with the positive input terminal of the operational amplifier, the fourth resistance and the fifth resistance at the other end are respectively connected with two switch terminals of the switch, the negative input terminal of the operational amplifier is grounded, the output terminal of the operational amplifier is respectively connected with the array substrate voltage output terminal and the color filter substrate voltage output terminal, and the control terminal of the switch is connected with the power source.

13. The device for detecting a bright dot or a dark dot in a LCD according to claim 10, wherein
the power source comprises a first power source for providing a first detection voltage and a second power source for providing a second detection voltage, the first power source is connected with the array substrate voltage output terminal, the first power source and the second power source are respectively connected with two switch terminals of the switch, and
a control terminal of the switch is connected with the color filter substrate voltage output terminal.

14. The device for detecting a bright dot or a dark dot in a LCD according to claim 10, wherein
the power source comprises a first power source for providing a first detection voltage and a second power source for providing a second detection voltage, the first power source and the second power source are respectively connected with two switch terminals of the switch, and a control terminal of the switch is connected with the array substrate voltage output terminal and the color filter substrate voltage output terminal.

* * * * *